United States Patent [19]

Seybold

[11] Patent Number: 4,486,587

[45] Date of Patent: Dec. 4, 1984

[54] CONCENTRATION OF LIGHT OVER A PARTICULAR AREA AND NOVEL FLUORESCENT COMPOUNDS

[75] Inventor: Guenther Seybold, Neuhofen, Fed. Rep. of Germany

[73] Assignee: BASF Aktiengesellschaft, Ludwigshafen, Fed. Rep. of Germany

[21] Appl. No.: 409,833

[22] Filed: Aug. 20, 1982

[30] Foreign Application Priority Data

Aug. 24, 1981 [DE] Fed. Rep. of Germany ....... 3133390

[51] Int. Cl.$^3$ .............................................. C07D 39/00
[52] U.S. Cl. .................................. 544/99; 252/301.16; 260/353; 260/355; 260/361; 546/23; 546/28; 548/217
[58] Field of Search .................... 546/23, 28; 260/353, 260/355, 361; 252/301.16; 548/217; 544/99

[56] References Cited

U.S. PATENT DOCUMENTS

| | | | |
|---|---|---|---|
| 1,713,680 | 5/1929 | Stein et al. | 260/353 |
| 1,736,084 | 11/1929 | Kranzlein et al. | 260/353 |
| 2,075,456 | 3/1937 | Neresheimer et al. | 260/355 |
| 3,678,053 | 7/1972 | Boffa et al. | 546/28 |
| 4,198,529 | 4/1980 | Grelat et al. | 260/355 |

FOREIGN PATENT DOCUMENTS 1247496 9/1971 United Kingdom .

OTHER PUBLICATIONS

Chemical Abstracts 9th Collective Index, pp. 13877CS–13878CS.
Chemical Abstracts, vol. 94, (1981), p. 619, #74688.

Primary Examiner—Arthur P. Demers
Attorney, Agent, or Firm—Oblon, Fisher, Spivak, McClelland & Maier

[57] ABSTRACT

A process for concentrating light over a particular area by means of fluorescent compounds in plastic plates or films, wherein the fluorescent compounds used are those of the formula

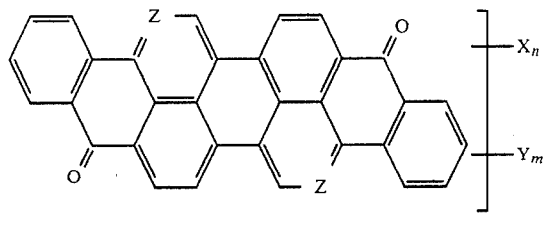

or

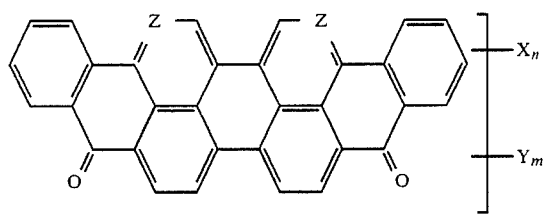

where Z is =N— or =CH—, Y is —OSO$_2$R$^1$,

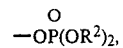

—OCOR$^1$ or —OR$^3$, or 2 Y together are

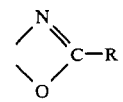

where R is alkyl, X is fluorine, chlorine, C$_1$–C$_{20}$-alkyl, C$_3$–C$_{20}$-alkenyl, aralkyl, —COR$^1$, —SO$_2$R$^1$, —OPO(OR$^2$)$_2$, —NH—COR$^1$ or —NH—SO$_2$—R$^1$, m is 2, 3 or 4, n is 0, 1 or 2; R$^1$ is unsubstituted or substituted alkyl, alkenyl or an aromatic or heteroaromatic radical and, when Y is —OCOR$^1$, may furthermore be alkoxy or cycloalkoxy, R$^2$ is alkyl or cycloalkyl and R$^3$ is alkyl, alkenyl, C$_2$- or C$_3$-alkylenecarboalkoxy, alkyl-substituted benzyl or cyclohexyl or a monocyclic, bicyclic or polycyclic saturated hydrocarbon radical.

Some of the compounds I and II are new.

The compounds I and II exhibit fluorescence in the range from 580 to 750 nm, and have a very high fluorescent quantum efficiency, particularly good light fastness and high thermostability.

6 Claims, No Drawings

CONCENTRATION OF LIGHT OVER A PARTICULAR AREA AND NOVEL FLUORESCENT COMPOUNDS

The present invention relates to a process for concentrating light by means of fluorescent compounds, and to novel fluorescent compounds.

German Laid-Open Applications DOS No. 2,620,115 and DOS No. 2,554,226 disclose devices in which visible light can be concentrated over a particular small area of a plastic plate by means of fluorescent centers incorporated therein.

The compounds required as fluorescent centers in these devices must be very lightfast, particularly when they are used for converting light energy to electrical energy, so that the devices have an adequate lifetime in use.

It is an object of the present invention to provide compounds which are suitable as fluorescent centers in the conventional devices for light concentration, possess high fluorescene coupled with good light fastness in the medium used, and do not have an adverse effect on the medium.

We have found that excellent results are achieved when light is concentrated over a particular area by means of fluorescent compounds in a plastic plate or a film if the fluorescent compounds used are those of the formula

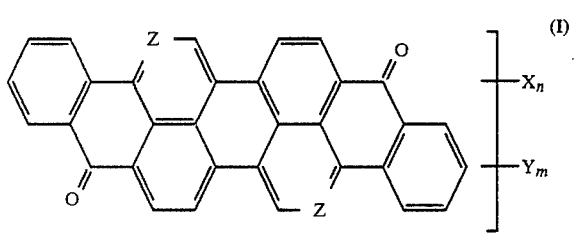
(I)

or

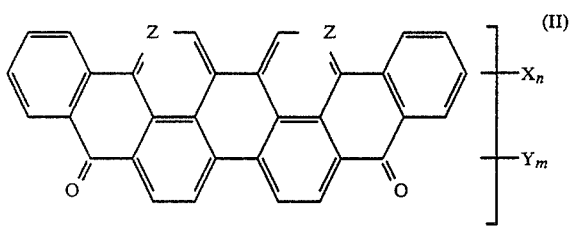
(II)

where Z is =N— or =CH—, Y is —OSO$_2$R$^1$,

—OP(OR$^2$)$_2$,

—OCOR$^1$ or —OR$^3$, or 2 Y together are

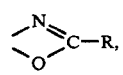

where R is C$_1$-C$_{18}$-alkyl, X is fluorine, chlorine, C$_1$-C$_{20}$-alkyl, C$_3$-C$_{20}$-alkenyl, aralkyl, —COR$^1$, —SO$_2$R$^1$, —OPO(OR$^2$)$_2$, —NH—COR$^1$ or —NH—SO$_2$R$^1$, m is 2, 3 or 4, n is 0, 1 or 2, R$^1$ is unsubstituted or fluorine-substituted C$_1$-C$_{20}$-alkyl, C$_3$-C$_{20}$-alkenyl, aryl or an aromatic or heteroaromatic radical which is unsubstituted or substituted by fluorine, chlorine, cyano, C$_1$-C$_{20}$-alkyl, C$_1$-C$_{20}$-alkoxy, C$_1$-C$_{20}$-alkoxycarbonyl or phenyl, and, when Y is —OCOR$^1$, R$^1$ may furthermore be —OR$^{11}$ where R$^{11}$ is C$_1$-C$_{18}$-alkyl, cyclohexyl which is substituted by 1, 2 or 3 C$_3$-C$_{10}$-alkyl radicals, or a radical of a saturated monocyclic, bicyclic or polycyclic C$_7$-C$_{30}$-hydrocarbon, and when X is —COR$^1$, R$^1$ may furthermore be C$_1$-C$_{18}$-alkoxy, R$^2$ is C$_1$-C$_{18}$-alkyl or is cyclohexyl which is substituted by from 1 to 3 C$_3$-C$_{10}$-alkyl radicals or is a radical of a saturated monocyclic, bicyclic or polycyclic C$_7$-C$_{30}$-hydrocarbon wherein the O atom is bonded to a carbon atom of a carbocyclic ring either directly or via a C$_1$-C$_3$-alkylene group, R$^3$ is C$_1$-C$_{20}$-alkyl, C$_3$-C$_{20}$-alkenyl or C$_2$- or C$_3$-alkylenecarbo-C$_1$-C$_{20}$-alkoxy, or is benzyl which is substituted by C$_3$-C$_{20}$-alkyl, or is cyclohexyl which is substituted by 1, 2 or 3 C$_3$-C$_{10}$-alkyl radicals, or is a radical of a saturated monocyclic, bicyclic or polycyclic C$_7$-C$_{30}$-hydrocarbon, or a radical of the formula

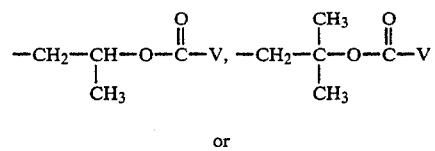

or

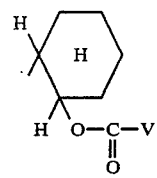

and V is C$_8$-C$_{19}$-alkyl, 4-(C$_3$-C$_{20}$-alkyl)-phenyl or a radical of a saturated monocyclic, bicyclic or polycyclic C$_7$-C$_{30}$-hydrocarbon.

The present invention furthermore relates to novel fluorescent dyes of the formulae

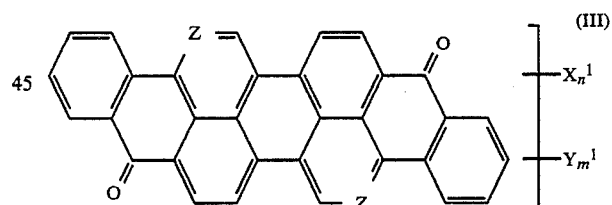
(III)

and

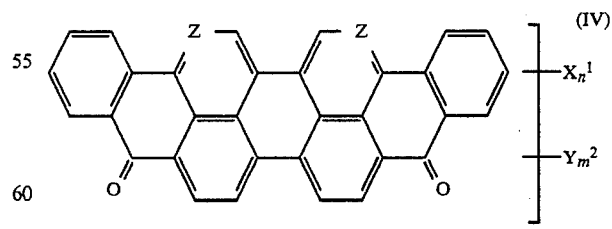
(IV)

where Z is =N— or

Y$^1$ is —OSO$_2$R$^1$,

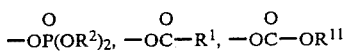

or $OR^3$, one or more radicals $Y^2$ are each a radical of the formula $-OSO_2R^1$, $-O-PO(OR^2)_2$, $-O-CO-R^1$, $-O-CO-OR^{11}$ or $OR^4$ and the remaining radicals $Y^2$ are each $-OR^5$, $X^1$ is fluorine, chlorine, $C_1-C_{20}$-alkyl, $C_3-D_{20}$-alkenyl, aralkyl, $-COR^1$, $-SO_2R^1$,

$-NH-COR^1$ or $-NH-SO_2R^1$, m is 2, 3 or 4, n is 0, 1 or 2, $R^1$ is unsubstituted or fluorine-substituted $C_1-C_{20}$-alkyl, $C_3-C_{20}$-alkenyl, or unsubstituted or $C_1-C_{18}$-alkyl-substituted phenyl, $R^2$ is $C_1-C_{18}$-alkyl, or is cyclohexyl which is substituted by 1 or 2 $C_3-C_{10}$-alkyl radicals or is a saturated monocyclic, bicyclic or polycyclic $C_7-C_{30}$-hydrocarbon radical, $R^3$ is $C_4-C_{20}$-alkyl, $C_4-C_{20}$-alkenyl, $C_2$- or $C_3$-alkylenecarbo-$C_1-C_{20}$-alkoxy, $C_3-C_{20}$-alkyl-substituted benzyl, V or a radical of the formula

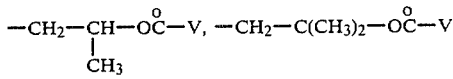

or

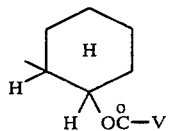

$R^{11}$ is $C_4-C_{20}$-alkyl or is cyclohexyl which is substituted by 1 or 2 $C_3-C_{10}$-alkyl radicals or is a saturated monocyclic, bicyclic or polycyclic $C_7-C_{30}$-hydrocarbon radical, $R^4$ is $C_2$- or $C_3$-alkylenecarbo-$C_1-C_{20}$-alkoxy or $C_3-C_{20}$-alkyl-substituted benzyl, or is cyclohexyl which is substituted by 1 or 2 $C_3-C_{10}$-alkyl radicals, $R^5$ is $C_4-C_{20}$-alkyl and V is $C_8-C_{19}$-alkyl, 4-($C_3-C_{20}$-alkyl)-phenyl or a saturated monocyclic, bicyclic or polycyclic $C_7-C_{30}$-hydrocarbon radical.

In formulae I, II, III and IV, Z is preferably =CH—.

The dyes of the formulae I, II, III and IV exhibit fluorescence in the range of about 580 to 750 nm, and have a very high fluorescent quantum efficiency, particularly good light fastness and high thermostability.

The radicals in the formulae of the substituents Y and X have the following meanings:

1. $R^1$ is unsubstituted or fluorine-substituted $C_1-C_{20}$-alkyl, $C_3-C_{20}$-alkenyl or aryl, or an aromatic or heteroaromatic radical which is unsubstituted or substituted by chlorine, fluorine, cyano, $C_1-C_{20}$-alkyl, $C_1-C_{20}$-alkoxy, $C_1-C_{20}$-alkoxycarbonyl or phenyl; when Y is $-O-COR^1$, $R^1$ may also be $-OR^{11}$ where $R^{11}$ is $C_1-C_{18}$-alkyl or a cyclohexyl which is substituted by 1, 2 or 3 $C_3-C_{10}$-alkyl radicals or is a saturated monocyclic, bicyclic or polycyclic $C_7-C_{30}$-hydrocarbon radical; and when X is $-COR^1$, $R^1$ may also be $C_1-C_{18}$-alkoxy;

1.1 alkyl and alkenyl are methyl, ethyl, propyl, butyl, hexyl, octyl, 2-ethylhexyl, decyl, dodecyl, tetradecyl, hexadecyl, octadecyl, $-C_6F_{13}$, $-C_8H_{17}$, $-CF_3$, oleyl, adamantyl, or tricyclo[5,2,1,0$^{2,6}$]decyl;

1.2 aryl, substituted aryl or heteroaryl is phenyl which is unsubstituted or substituted by $C_1-C_{20}$-alkyl, chlorine, fluorine or carbo-$C_1-C_{20}$-alkoxy, or naphthyl, for example, 2-tolyl, 4-tolyl, butylphenyl, hexylphenyl, octylphenyl, diisopropylnaphthyl, dibutylnaphthyl, dodecylphenyl, diphenyl, trimethylphenyl, thienyl and methylthienyl;

1.3 alkoxy is methoxy, ethoxy, propoxy, butoxy, hexoxy, octoxy, 2-ethylhexoxy, decoxy, dodecoxy, tetradecoxy, hexadecoxy or octadecoxy;

1.4 alkyl-substituted cyclohexyl radicals $R^1$, $R^2$ and $R^3$ are 4-isopropylcyclohexyl, tert.-butylcyclohexyl or i-$C_5$- or i-$C_6$-alkylcyclohexyl.

2. $R^2$ is $C_1-C_{18}$-alkyl, eg. methyl, ethyl, propyl, butyl, hexyl, octyl, decyl, dodecyl, tetradecyl, hexadecyl or octadecyl.

3. $R^3$ is $C_1-C_{20}$-alkyl, $C_3-C_{20}$-alkenyl, $C_2$- or $C_3$-alkylenecarbo-$C_1-C_{20}$-alkoxy or $C_1-C_{20}$-alkyl-substituted benzyl;

3.1 alkyl and alkenyl are methyl, ethyl, propyl, butyl, hexyl, octyl, decyl, dodecyl, tetradecyl, hexadecyl, octadecyl, 2-ethylhexyl, cyclohexyl, oleyl, 2-hydroxyethyl or 2-hydroxypropyl;

3.2 $C_2-C_3$-alkylenecarboalkoxy are, for example, $-CH_2-CH_2-CO-OR^6$ or

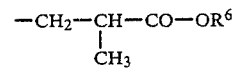

where $R^6$ is $C_1-C_{20}$-alkyl, eg. the alkyl radicals mentioned under 3.1;

3.3 alkyl-substituted benzyl is, for example, 4-methylbenzyl, 4-butylbenzyl, 4-dodecylbenzyl, 4-nonylbenzyl, 4-hexadecylbenzyl or 4-octadecylbenzyl.

Radicals $R^1$ and $R^3$ in the substituents Y are each preferably $C_3-C_{20}$-alkyl, and $R^1$ may furthermore be fluorine-substituted alkyl.

Specific examples of substituents Y are:

4. $-OSO_2R^1$, $-OCOR^1$ and $-O-CO-OR^{11}$;

4.1 $-OSO_2-CH_3$; $-OSO_2CF_3$; $-OSO_2-C_2H_5$; $-OSO_2C_4H_9$; $-OSO_2C_6H_{13}$; $-OSO_2C_6F_{13}$; $-OSO_2C_8H_{17}$; $-OSO_2-C_8F_{17}$, $-OSO_2-C_{10}H_2$; $-OSO_2-C_{12}H_{25}$; $-OSO_2-C_7H_{15}$; and $OSO_2-C_7F_{15}$;

4.2

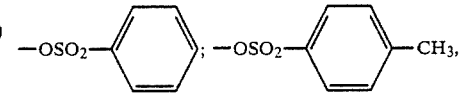

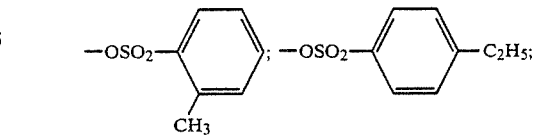

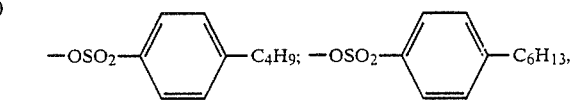

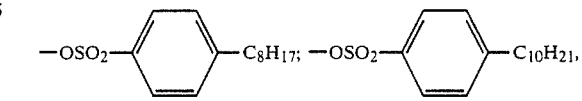

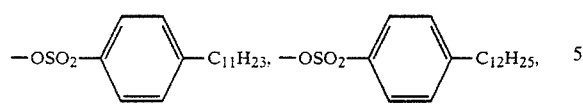

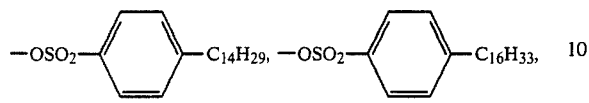

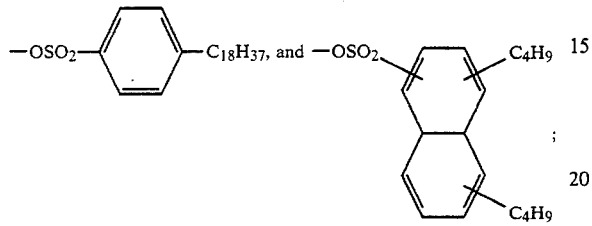

4.3 —OCOC$_2$H$_5$; —OCOC$_3$H$_7$, —OCOC$_4$H$_9$, —O-COC$_6$H$_{17}$; —OCOC$_7$H$_{15}$, —OCOC$_8$H$_{17}$, —O-CO—C$_{17}$H$_{35}$, —OCOC$_{11}$H$_{23}$, —OCOC$_{15}$H$_{31}$, —OCOCF$_3$, —OCO—C$_6$F$_{13}$; —OCO—C$_7$F$_{15}$, —OCOC$_{17}$H$_{33}$ (oleyl), —OCOC$_{10}$H$_{15}$— (=—O—CO-Adamantyl) and —OCO-(Tricyclo[5.2.1.0$^{2.6}$]decyl);

4.4

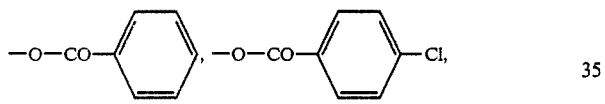

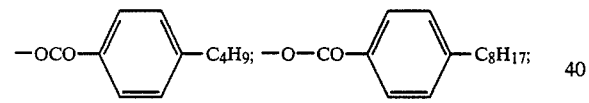

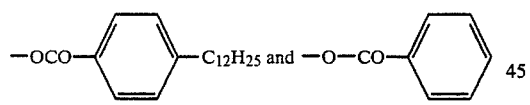

4.5 —OCO—OCH$_3$; —OCO—OC$_2$H$_5$; —O-CO—OC$_4$H$_9$, —OCO—OC$_{12}$H$_{25}$ —OCO—OC$_{16}$H$_{35}$;

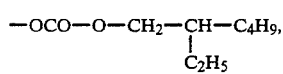

—OCO—O—CH$_2$—C(CH$_3$)$_3$;

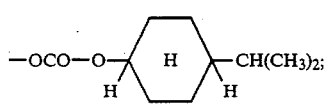

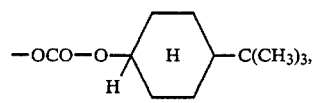

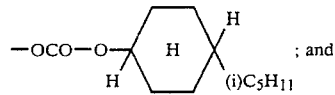

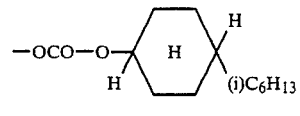

5. —OPO(OR$^2$)$_2$: —OPO(OCH$_3$)$_2$; —OPO(OC$_2$H$_5$)$_2$, —OPO(OC$_4$H$_9$)$_2$; —OPO(OC$_6$H$_{13}$)$_2$; -OPO-(OC$_8$H$_{17}$)$_2$, OPO(OC$_{10}$H$_{21}$)$_2$, OPO(OC$_{16}$H$_{33}$)$_2$ and

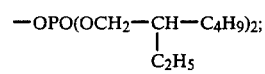

6. —OR$^3$ is methoxy, ethoxy, i-propoxy, n-propoxy, butoxy, hexoxy, octoxy, 2-ethylhexoxy, decoxy, dodecoxy, tetradecoxy, hexadecoxy and octadecoxy; 2-methoxyethoxy, 2-methoxypropoxy, —O—C$_2$H$_4$—COO—C$_2$H$_5$, —O—C$_2$H$_4$—COOC$_2$H$_4$—OCH$_3$ and —OC$_2$H$_4$—COOC$_4$H$_9$.

7. Suitable radicals R$^2$, R$^3$, R$^4$, R$^{11}$ and V are, in addition to the other radicals, those of saturated monocyclic, bicyclic or polycyclic C$_7$-C$_{30}$-hydrocarbons. These hydrocarbon radicals are bonded to a carbon atom of the cyclic ring system either directly or via an alkylene group. The bonding may be effected, for example, via —O—,

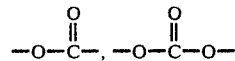

and/or groups of the formula

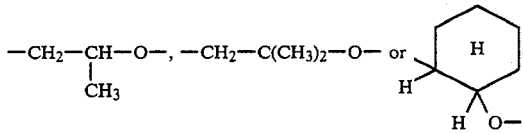

Examples of suitable radicals of monocyclic, bicyclic or polycyclic hydrocarbons are those which are derived from cyclopentane and from hydrogenated Diels Alder adducts of cyclopentadiene with a compound having a reactive double bond (a philodienic compound), eg. a compound based on bicycloheptane, bicyclooctane or adamantane, and derivatives obtained from Perhydro-1H-cyclopenta[a]phenanthrene, which is also referred to as sterane. These basic structures are unsubstituted or substituted by one or more C$_1$-C$_{10}$-alkyl groups.

Specific examples of these hydrocarbon radicals are:

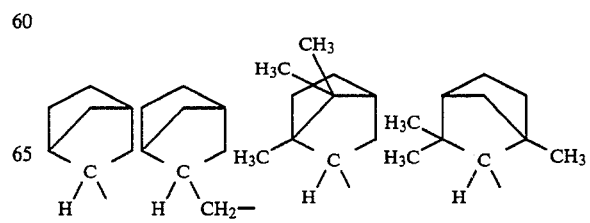

-continued

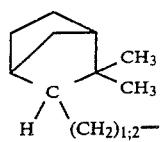 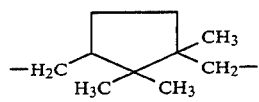

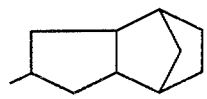 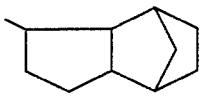

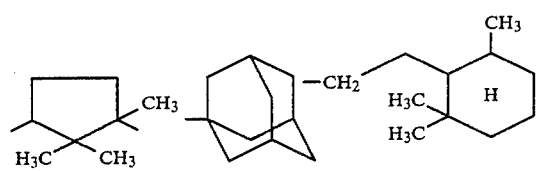

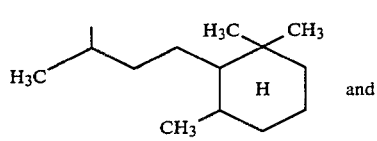 and

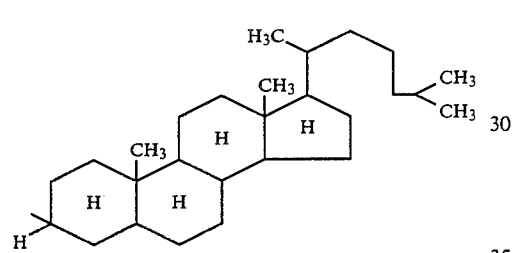

Preferably, Y is —OCO—($C_3$–$C_{18}$)-alkyl or —OSO$_2$—($C_3$–$C_{18}$)-alkyl, where each alkyl is unsubstituted or substituted by fluorine or by $C_1$-$C_8$-alkoxy, or is —O—CO—O—$R^{11}$, —OPO(OR$^2$)$_2$ or —OR$^3$.

Particularly preferably, Y is —OCO—($C_3$–$C_{18}$)-alkyl where alkyl is unsubstituted or substituted by $C_1$-$C_8$-alkoxy, or is —OCO—$OR^{11}$, —OPO(OR$^2$)$_2$ or —OR$^3$, where $R^{11}$ has the above meaning and $R^2$ is $C_4$-$C_{18}$-alkyl, 4-($C_3$-$C_{10}$-alkyl)-cyclohexyl or a radical of a saturated monocyclic, bicyclic or polycyclic $C_7$-$C_{30}$-hydrocarbon, $R^3$ is $C_3$-$C_{18}$-alkyl, 4-($C_3$-$C_{10}$-alkyl)-cyclohexyl, a radical of a saturated monocyclic, bicyclic or polycyclic $C_7$-$C_{30}$-hydrocarbon or a radical of the formula

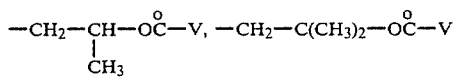

or

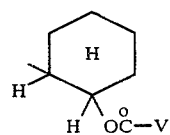

and V is $C_8$-$C_{19}$-alkyl, 4-($C_3$-$C_{20}$-alkyl)-phenyl or a radical of a saturated monocyclic, bicyclic or polycyclic $C_7$-$C_{30}$-hydrocarbon.

Specific examples of X in addition to the radicals specifically stated are:

7.1 $C_1$-$C_{20}$-alkyl and alkenyl, suitable radicals being those mentioned under 1.1 for $R^1$, and 7.2 aralkyl, for example benzyl which is substituted by cyano, $C_1$-$C_8$-alkoxycarbonyl or chlorine, such as 2-cyanobenzyl,

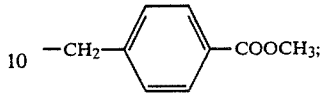

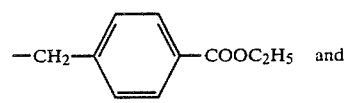

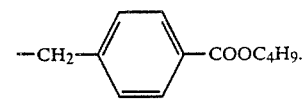

Further examples of radicals X are:

7.3 —COR$^1$, eg. —COCH$_3$ and —CO—$C_3H_7$, —CO—O—$C_1$-$C_{18}$-alkyl, eg. —CO—O—OH$_3$, —CO—OC$_4$H$_9$, —CO—OC$_6$H$_{13}$, —CO—OC$_8$H$_{17}$, —CO—OC$_{10}$H$_{21}$ and —CO—OC$_{12}$H$_{25}$, and —SO$_2$R$^1$, eg. —SO$_2$—CH$_3$, —SO$_2$C$_4$H$_9$, —SO$_2$—C$_6$H$_{13}$, —SO$_2$—C$_8$H$_{17}$; —SO$_2$C$_4$F$_9$; —SO$_2$—C$_6$F$_{13}$, —SO$_2$—C$_8$F$_{17}$ and

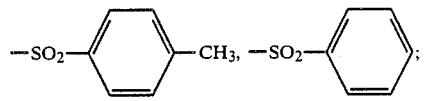

7.4 —OPO(OR$^2$)$_2$, eg. —OPO (OCH$_3$)$_2$;
7.5 —NH—COR$^1$ and —NH—SO$_2$R$^1$, eg. —NH—COCH$_3$, —NH—COC$_3$H$_7$,

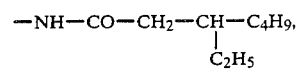

—NH—CO—C$_{17}$H$_{33}$, —NH—SO$_2$—C$_4$H$_9$, —NH—SO$_2$—C$_6$H$_{13}$, —NH—SO$_2$—C$_8$H$_{17}$,

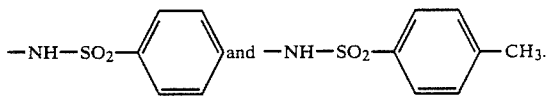

Where the compound of the formula I (isoviolanthrene-9,18-dione) is disubstituted by Y, these substituents are preferably in positions 2 and 11 or 4 and 13 or 5 and 14, in particular in positions 6 and 15, and in the case of the corresponding tetrasubstitution, the positions 15, 16, 17 and 18 are preferred.

Where the compounds of the formula II (violanthrene-5,10-dione) are disubstituted by Y, these substituents are preferably in positions 16 and 17 or 3 and 12 or 1 and 14 or 15 and 18, in particular in positions 16 and 17, and in the case of tetrasubstitution, positions 1, 14, 16 and 17 are preferred.

Preferred compounds are those of the formulae

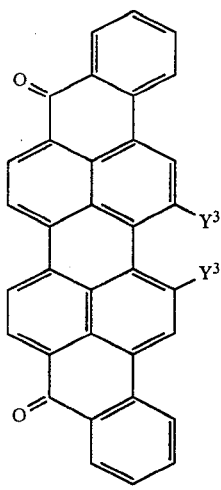

and

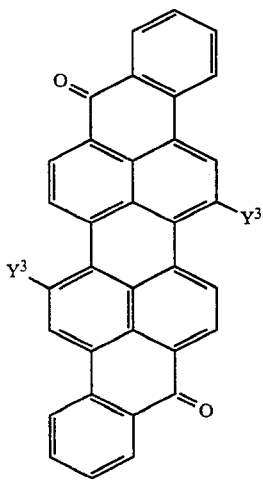

where Y³ is —OSO₂R¹,

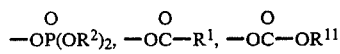

or OR³, R¹ is unsubstituted or fluorine-substituted C₁–C₂₀-alkyl, C₃–C₂₀-alkenyl or unsubstituted or C₁–C₁₈-alkyl-substituted phenyl, R² is C₁–C₁₈-alkyl, or is cyclohexyl which is substituted by 1 or 2 C₃–C₁₀-alkyl radicals or is a saturated monocyclic, bicyclic or polycyclic C₇–C₃₀-hydrocarbon radical, R³ is C₄–C₂₀-alkyl or C₄–C₂₀-alkenyl or is cyclohexyl which is substituted by 1 or 2 C₃–C₁₀-alkyl radicals or is a saturated monocyclic, bicyclic or polycyclic C₇–C₃₀-hydrocarbon radical or a radical of the formula

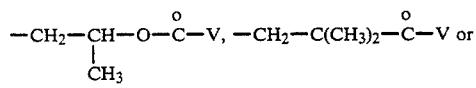

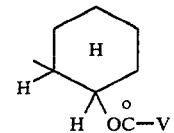

R¹¹ is C₄–C₂₀-alkyl or is cyclohexyl which is substituted by 1 or 2 C₃–C₁₀-alkyl radicals or is a saturated monocyclic, bicyclic or polycyclic C₇–C₃₀-hydrocarbon radical and V is C₈–C₁₉-alkyl, 4-(C₃–C₂₀-alkyl)-phenyl or a saturated monocyclic, bicyclic or polycyclic C₇–C₃₀-hydrocarbon radical.

Very particularly preferred dyes of the formulae V and VI are those in which the substituents Y³ are bulky. Examples of such substituents are

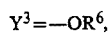

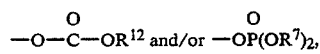

where R⁶ is 4-(C₃–C₁₀-alkyl)-cyclohexyl, a saturated monocyclic, bicyclic or polycyclic C₇–C₃₀-hydrocarbon radical or a radical of the formula

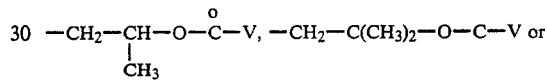

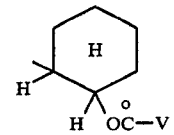

V is C₈–C₁₉-alkyl, 4-(C₃–C₂₀-alkyl)-phenyl or a saturated monocyclic, bicyclic or polycyclic C₇–C₃₀-hydrocarbon radical, R⁷ is C₈–C₁₈-alkyl, 4-(C₃–C₂₀-alkyl)-phenyl or a saturated monocyclic, bicyclic or polycyclic C₇–C₃₀-hydrocarbon radical, and R¹² is C₈–C₂₀-alkyl, 4-(C₃–C₁₀-alkyl)-cyclohexyl or a saturated monocyclic, bicyclic or polycyclic C₇–C₃₀-hydrocarbon radical.

Compared with the other isoviolanthrone and violanthrone dyes, the last-mentioned dyes possess improved lightfastness.

Some of the compounds of the formulae I and II are known, but the compounds of the formulae III, IV, V and VI are new.

The compounds of the formulae I to VI are obtained by reacting the corresponding dihydroxy- or tetrahydroxyviolanthrenediones or -isoviolanthrenediones with an appropriate acylating agent or alkylating agent.

The acylation is carried out, for example, with an appropriate acid halide, eg. a carboxylic acid chloride, phosphoric acid chloride or sulfonic acid chloride, in pyridine or nitrobenzene, in the presence of sodium carbonate or potassium carbonate.

The ethers are prepared by carrying out the reaction using an appropriate alkylating agent in dimethylformamide or nitrobenzene. Details of the preparation are to be found in the examples.

The products of the formulae I to VI may be purified by a conventional process, for example by recrystallization from an organic solvent, by the counter-current distribution method of Craig, or by chromatography, eg. column chromatography, high pressure liquid chromatography or preparative layer chromatography. If necessary. the purification process is repeated once or several times or various purification processes are combined in order to obtain very pure compounds.

The compounds (I) to (VI) are used by incorporating them in plastics which are suitable for the particular application. For this purpose, the plastic, in the form of granules, is dusted with the required amount of dye, and the granules are then extruded to give sheet-like structures. Plastics (media) which are preferably used, for example, to concentrate light for solar cells are polymethylmethacrylate, polymethylacrylate, polystyrene and polydiethyleneglycol diallylbiscarbonate, as well as suitable nylons and polycarbonates, and polyvinyl chloride.

Because the compounds (I) to (VI) are readily soluble in organic solvents these compounds may also be employed when the plastic plates are produced by casting. Moreover, it is also possible for the light-collecting systems to contain the compounds (I) to (VI) in the form of a solution, for example in an alcohol, a ketone, a halohydrocarbon or an ether.

The novel light-collecting systems may be used, for example, in association with solar cells to utilize solar energy, and in conventional scintillators (cf., for example, J. B. Birks: The Theory and Practice of Scintillation Counting (Pergamon Press, London 1964); J. Opt. Am. 39 (1949), 912; J. Appl. Phys. 40 (1969), 3544; Nuclear Instruments and Methods 87 (1970), 111–123; Research Disclosure (1977), page 43; and German Laid-Open Application DOS No. 2,629,641). In addition, they are useful, in association with electronic controls, as displays with very low energy consumption. They are also suitable in the absence of electronic components for many display, indication and marking purposes, for example in passive display elements, indicators and traffic signs, eg. traffic lights, and in drawing instruments.

The examples which follow illustrate the invention. Parts and percentages are by weight. The absorption maxima were determined using solutions of the dyes in chloroform.

EXAMPLE 1

11.6 parts of 16,17-dihydroxyviolanthrene-5,10-dione are dissolved in 200 parts of pyridine, 10 parts of 2-ethylhexanoyl chloride are added and the mixture is then stirred for 2 hours at 25°–40° C. The precipitate is filtered off under suction and washed with methanol, and 14 parts of the compound given below are obtained. The product may be purified by recrystallizing it 3 times from heavy gasoline (of boiling point 130°–150° C.).

Deep red crystals of melting point 262°–263° C. are obtained.

$\lambda_{max} = 575$ nm (chloroform); emission maximum = 619 nm; fluorescent quantum efficiency = 90%.

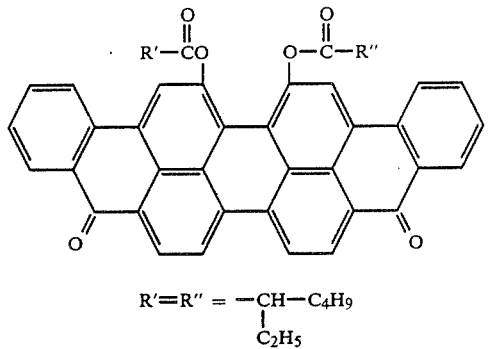

$R' = R'' = -\underset{\underset{C_2H_5}{|}}{CH} - C_4H_9$

EXAMPLES 2 TO 13

Esters of the formula given below are prepared from 16,17-dihydroxyviolanthrene-5,10-dione by a procedure similar to that described in Example 1. The meanings of Z and Z' are given in the table below:

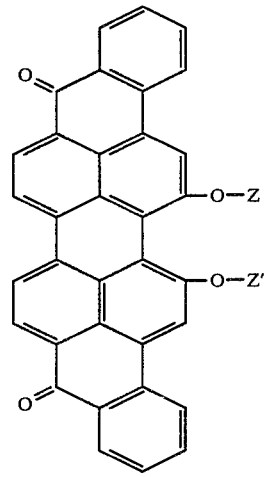

(V)

| Example | Z = Z' | $\lambda_{max}$ [nm] | mp. [°C.] |
|---|---|---|---|
| 2 | —COC$_8$H$_{17}$ | 575 | 234 |
| 3 | —COC$_{17}$H$_{33}$ | 576 | 191 |
| 4 | —CO—OC$_2$H$_5$ | 580 | >300 |
| 5 | —COC(CH$_3$)$_3$ | 576 | >300 |
| 6 | —CO—C$_6$H$_2$(CH$_3$)$_3$ (3,5-dimethyl-4-methyl) | 575 | >300 |
| 7 | —SO$_2$—C$_6$H$_4$—CH$_3$ | 581 | >300 |
| 8 | —SO$_2$—C$_6$H$_4$—C$_{11}$H$_{23}$ | 580 | 180 |
| 9 | —SO$_2$C$_6$F$_{13}$ | 590 | |
| 10 | —COC$_7$F$_{15}$ | 589 | |
| 11 | —PO(OC$_2$H$_5$)$_2$ | 584 | |

-continued

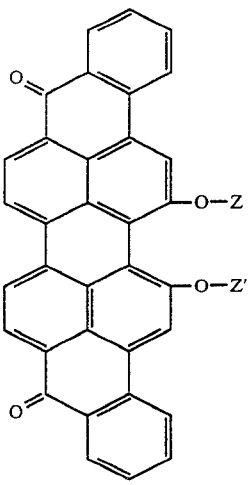

(V)

| Example | Z = Z' | $\lambda_{max}$ [nm] | mp. [°C.] |
|---------|--------|----------------------|-----------|
| 12 | —PO(OC$_4$H$_9$)$_2$ | 583 | |

EXAMPLE 13

11.6 parts of 16,17-dihydroxyviolanthrene-5,10-dione are dissolved in 200 parts of pyridine and then reacted with 2 parts of p-toluenesulfonyl chloride at 50° C., the reaction time being 1 hour. The product is then reacted with 2 parts of trimethylbenzoyl chloride at 60° C. After 1 hour at 60° C., the dye is precipitated by the addition of methanol and the product is purified by column chromatography (silica gel/CHCl$_3$). 5 parts of the dye of the formula (V) where Z is

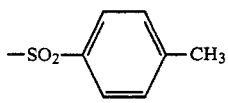

and Z' is

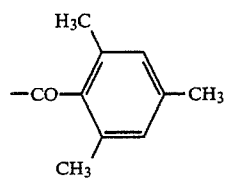

are obtained.

EXAMPLE 14

11.6 parts of 16,17-dihydroxyviolanthrene-5,10-dione, 200 parts of dimethylformamide, 15 parts of oct-1-yl bromide and 17 parts of anhydrous potassium carbonate are heated at 100° C. for 5 hours. The product of the formula (V) where Z and Z' are each -n-C$_8$H$_{17}$ is filtered off under suction, washed with methanol and recrystallized twice from ethylene glycol monomethyl ether.

Yield: 11 parts; mp. 198°–201° C.; $\lambda_{max}$: 621 nm; emission maximum 710 nm; fluorescent quantum efficiency in DCCl$_3$: 60%.

EXAMPLE 15

The procedure described in Example 14 is followed, except that 14 parts of but-1-yl bromide are used instead of oct-1-yl bromide. 16,17-Di-n-butoxyviolanthrene-5,10-dione of melting point 275°–280° C. is obtained.

EXAMPLES 16 TO 18

12 parts of 17-hydroxy-16-isopropoxy-violanthrene-5,10-dione are dissolved in 190 parts of pyridine, 5 parts of 2-ethylhexanoyl chloride are added and the mixture is then heated at 50° C. for 2 hours. The product is isolated and purified as described in Example 1.

Yield: 10 parts of the compound of the formula (V). The meanings of Z and Z' are given in the table below.

The compounds of the formula (V) which are given in the table below are obtained by a similar procedure:

| Example | Z | Z' |
|---------|---|-----|
| 16 | —CH(CH$_3$)$_2$ | —CO—CH(C$_2$H$_5$)—C$_4$H$_9$ |
| 17 | —CH(CH$_3$)$_2$ | —SO$_2$—C$_6$H$_4$—C$_{12}$H$_{25}$ |
| 18 | —C$_4$H$_9$ (n) | —CO—C$_8$H$_{17}$ |

EXAMPLES 19 TO 26

The procedure described in Example 1 is followed, except that the same amount of 6,15-dihydroxyisoviolanthrene-9,18-dione is used. The compound obtained is that of formula (VI) below, where Z and Z' is 2-ethylhexanoyl. Mp. 269°–270° C.; $\lambda_{max}$: 571 nm; emission maximum 600 nm; fluorescent quantum efficiency in CHCl$_3$: 100%.

The compounds given in the table below are obtained by a similar procedure:

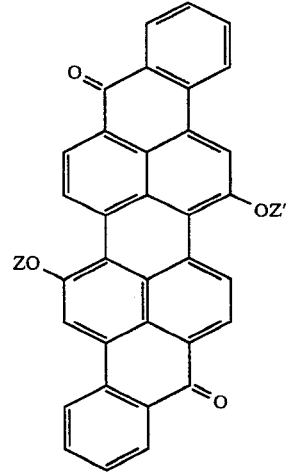

(VI)

| Example | Z = Z' | $\lambda_{max}$ [nm] | mp. [°C.] |
|---------|--------|----------------------|-----------|
| 19 | —CO—CH(C$_2$H$_5$)—C$_4$H$_9$ | 574 | 269-270 |

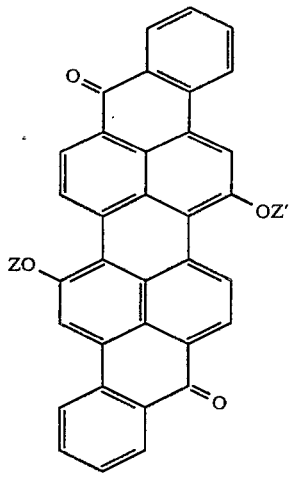

(VI)

ing material, compounds of the formula (VI) where Z and Z' have the meanings given in the table below are obtained.

| Example | Z | Z' | $\lambda_{max}$ [nm] | |
|---|---|---|---|---|
| 27 | —$C_8H_{17}$ | —$C_8H_{17}$ | 622 | emission maximum 660 nm; fluorescent quantum efficiency 85% |
| 28 | —$C_4H_9$ | —$C_4H_9$ | 622 | mp. 300° C. |
| 29 | —$CH(CH_3)_2$ | —CO—CH($C_2H_5$)—$C_4H_9$ | 594 | violet |
| 30 | " | —CO—$C_8H_{17}$ | 594 | violet |
| 31 | " | —$SO_2$—C$_6$H$_4$—$CH_3$ | 595 | bluish violet |
| 32 | " | —$SO_2$—C$_6$H$_4$—$C_{11}H_{23}$ | 596 | bluish violet |

| Example | Z = Z' | $\lambda_{max}$ [nm] | mp. [°C.] |
|---|---|---|---|
| 20 | —CO—$C_{17}H_{33}$ (Oleyl) | 574.5 | 176–194 |
| 21 | —$COC_8H_{17}$ | 573 | 256–259 |
| 22 | —$SO_2$—C$_6$H$_4$—$CH_3$ | 578 | >300 |
| 23 | —$SO_2$—C$_6$H$_4$—$C_{12}H_{25}$ | 577 | 185–192 |
| 24 | —$SO_2$—$C_6F_{13}$ | 589 | |
| 25 | —CO—$C_7F_{15}$ | 588 | |
| 26 | —$PO(OC_2H_5)_2$ | 579 | >300 |

EXAMPLES 27 TO 32

Using a procedure similar to that described in Example 14 or similar to that described in Example 16, with 6,15-dihydroxyisoviolanthrene-9,18-dione as the start-

EXAMPLES 33 TO 36

The compounds below are prepared by a procedure similar to that described in Example 1 or similar to that described in Example 14:

| Example | Starting material isoviolanthrene-9,18-dione | Compound | Color |
|---|---|---|---|
| 33 | 2,11-Dihydroxy | 2,11-(—OCO—CH($C_2H_5$)—$C_4H_9$)$_2$ | bluish red |
| 34 | 2,11-Dihydroxy | 2,11-(—$OC_8H_{17}$)$_2$ | greenish blue |
| 35 | 2,11-Dihydroxy | 2,11-(—$OSO_2$—C$_6$H$_4$—$CH_3$)$_2$ | red |
| 36 | 4,13-Dihydroxy | 4,13-(—$OC_8H_{17}$)$_2$ | yellowish red |

EXAMPLE 37

Using the procedure described in Example 14, 1, 14, 16, 17 tetrahydroxyviolanthrene-5,10-dione gives the corresponding 1, 14, 16, 17-tetraoctoxy compound (Z=$C_8H_{17}$), which produces a greenish blue solution.

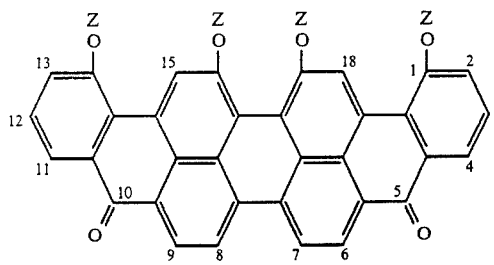 (VII)

EXAMPLE 38

Using a procedure similar to that described in Example 1, 1, 14, 16, 17-tetrahydroxyviolanthrene-5,10-dione gives the corresponding 1, 14, 16, 17-tetra-(2'-ethylhexanoyloxy)-violanthrene-5,10-dione of the formula (VII) where Z is

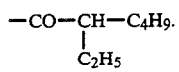

The product gives a red solution.

USE EXAMPLE 1

0.01% of the dye from Example 1 is dissolved in molten polymethylmethacrylate and homogeneously distributed therein, and the solution is processed to give fluorescent plates.

USE EXAMPLE 2

1,000 parts of polymethylmethacrylate (granules) are dusted uniformly with 0.05 parts of the dye from Example 2, and the mixture is then extruded to give plates.

USE EXAMPLES 3 TO 25

Fluorescent plates or fluorescent films are prepared as described in Use Examples 1 and 2:

| Example | Dye from Example | Material |
|---|---|---|
| 3 | 6 | polymethylmethacrylate |
| 4 | 7 | " |
| 5 | 9 | " |
| 6 | 10 | " |
| 7 | 11 | " |
| 8 | 14 | " |
| 9 | 16 | " |
| 10 | 19 | " |
| 11 | 19 | polyvinyl chloride |
| 12 | 19 | polystyrene |
| 13 | 19 | polycarbonate |
| 14 | 19 | polyethylene |
| 15 | 25 | " |
| 16 | 1 | " |
| 17 | 21 | " |
| 18 | 21 | polymethylmethacrylate |
| 19 | 23 | " |
| 20 | 24 | " |
| 21 | 27 | " |
| 22 | 32 | " |
| 23 | 16,17-dimethoxy-violanthrene-5,10-dione | " |
| 24 | 3,12-dichloro-16,17-dimethoxyviolanthrene-5,10-dione | " |
| 25 | 16,17,18-tristearoyloxy-violanthrene-5,10-dione | " |
| 26 | dichloro-6,15-dimethoxy-isovioanthrene-9,18-dione | " |

| Example | Dye from Example | Material |
|---|---|---|

EXAMPLE 39

(a) 58 parts of n-octyl bromide are added to 65.2 parts of bromoazabenzanthrone (VIII) in a suspension of 13.8 parts of potassium carbonate in 500 parts of N-methylpyrrolidine. The mixture is stirred for 2 hours at 100° C. and then cooled, after which it is poured onto ice-water and neutralized with glacial acetic acid. The precipitated product is filtered off under suction, washed with a large amount of water and dried. Yield: 76 parts of the benzanthrone compound of the formula (IX); melting point: 100°–105° C.

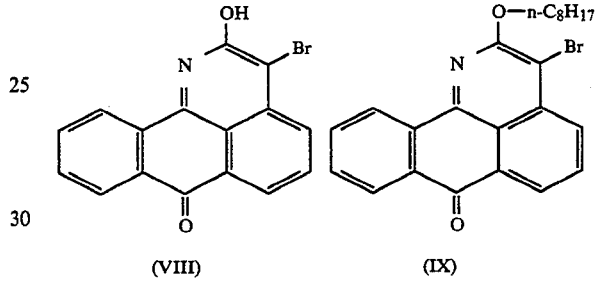

(VIII)                (IX)

(b) 17.4 parts of 44% strength dipotassium sulfide are added to 65.2 parts of the alkoxybromobenzanthrone from (a) in 600 parts of dimethylformamide. The mixture is stirred for 2 hours at 100° C., under $N_2$, and then cooled, whereupon the product is precipitated. It is filtered off under suction, washed with dimethylformamide or methanol and water, and dried. 34.2 parts of the compound of the formula

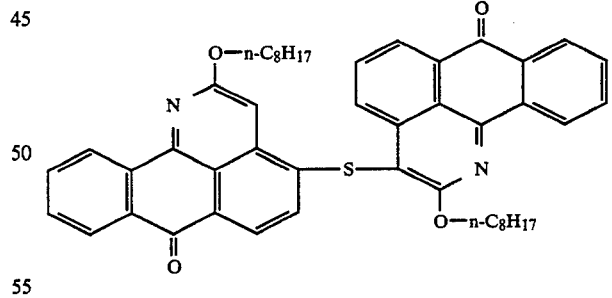

are obtained. Melting point: 190°–195° C.

(c) 31.4 parts of the product from (b) and 93.8 parts of KOH in 600 parts of butanol are refluxed for 5 hours. The butanol is then distilled off from the reaction mixture with steam, and the hot product is filtered off under suction, washed neutral, and boiled up in 150 parts of n-hexane. The mixture is again filtered under suction, the residue is heated in 150 parts of dimethylformamide at 100° C. and the hot product is filtered off under suction and washed with methanol and water. 15.3 parts of a fluorescent blue dye of the formula

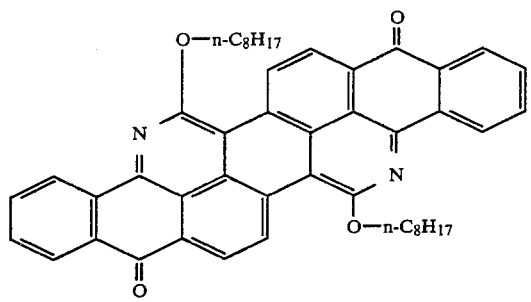

are obtained. Melting point: 295°–300° C.; $\lambda_{max}$ (CHCl$_3$): 660 nm; emission maximum: 696 nm.

EXAMPLE 40

(a) 14.4 parts of 6,15-dihydroxyisoviolanthrene-9,18-dione, 22.5 parts of cyclohexene oxide and 1.5 parts of piperidine in 250 parts of N-methylpyrrolidine are stirred for 8 hours at 170° C. The suspension is filtered under suction and the residue is washed with methanol and water. Yield: 11.7 parts of the compound of the formula (XII)

(XII)

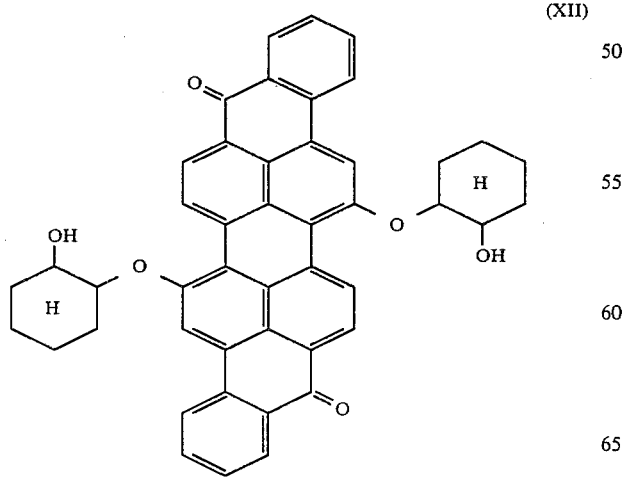

melting point: 300° C.; $\lambda_{max}$: 614 nm.

(b) If, instead of cyclohexene oxide, an equivalent amount of propylene oxide or isobutylene oxide is used, the corresponding hydroxyalkoxy compound can be obtained by a similar procedure.

(c) If, instead of 6,15-dihydroxyisoviolanthrene-4,18-dione, an equivalent amount of 16,17-dihydroxyviolanthrene-5,10-dione is used, the corresponding violanthrenedione derivative can be obtaind by the same procedure.

EXAMPLE 41

7.5 parts of tricyclodecanoyl chloride (a mixture of the 2- and 3-carboxylic acid chloride) are added dropwise to a solution of 3.4 parts of the compound of Example 40a in 80 parts of pyridine. The reaction mixture is stirred for 7 hours at 50° C. and then filtered, and methanol is added to the filtrate to precipitate the product, which is filtered off. The crude product is purified by chromatography over a column containing basic Al$_2$O$_3$, using CHCl$_3$ as the eluent. Yield: 4 parts of the red fluorescent dye of the formula

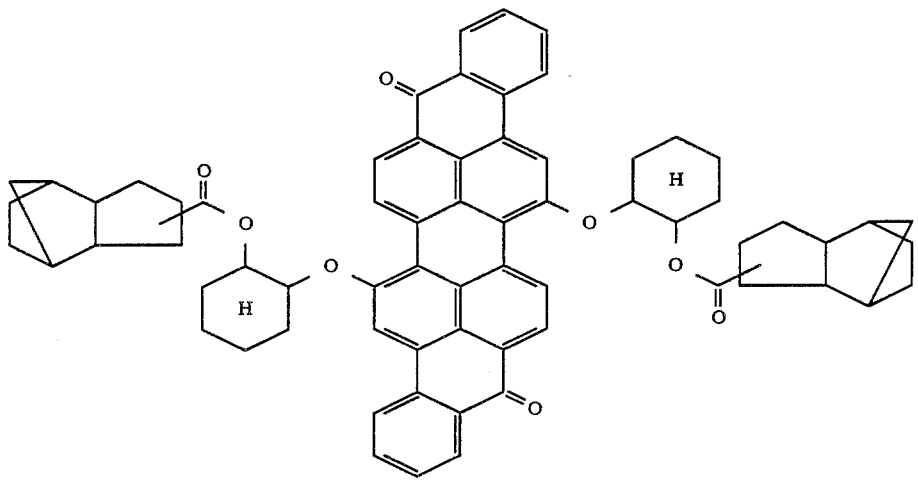

melting point: 218° C.; $\lambda_{max}$ (CHCl$_3$): 618 nm; emission
maximum: 675 nm.

EXAMPLES 42 TO 49

The fluorescent dyes of the formulae (X) which are listed in the table below are obtained by a procedure similar to that described in Example 41.

of 4-tert.-butylcyclohexyl chloroformate and 4 parts of pyridine in 600 parts of ethyl acetate, the mixture warming up to 50° C. during the addition. Thereafter, stirring is continued for 1 hour at room temperature, the reaction mixture is filtered over silica gel and the filtrate is evaporated down. Yield: 1.2 parts of the red fluorescent dye of the formula

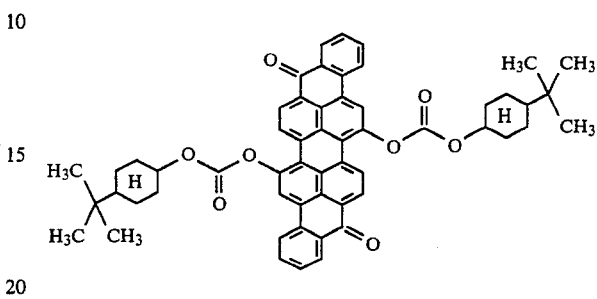

melting point: 162°–168° C.; $\lambda_{max}$: 572 nm; emission maximum: 603 nm.

EXAMPLE 51

20 parts of 4-tert.-butylcyclohexyl chloroformate are added to a suspension of 2.44 parts of 6,15-dihydroxyisoviolanthrene-9,18-dione in 100 parts of N-methylpyrrolidine. A solution of 1.1 parts of 1,4-diazabicyclo-(2,2,2)-octane (triethylenediamine) in 10 parts of N-methylpyrrolidine is added dropwise at 30° C., the reaction mixture warming up to 35° C. during the addition. Stirring is continued for a short time, and the mixture is then filtered. The product is precipitated from the filtrate by means of methanol/water, and is filtered off under suction. The residue is dissolved in methyl acetate, and the product is purified by filtering the solution over silica gel and concentrating the filtrate. The red fluorescent dye which is isolated is identical with the compound obtained in Example 50.

EXAMPLES 52 TO 57

The red fluorescent dyes of the formulae (X) and (Xa) which are listed in the table below are obtained by a procedure similar to that described in Example 51:

| Example | Formula (X) T | $\lambda_{max}$ [nm] |
|---|---|---|
| 52 | —C(=O)—O—n-C₁₆H₃₃ | 574 |
| 53 | (pinanyl carbonate group) | 573 |
| 54 | (cholesteryl carbonate group) | 574 |

-continued

| Example | Formula (X) T | $\lambda_{max}$ [nm] |
|---|---|---|
| 55 | 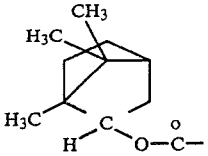 | 572 |
| 56 | 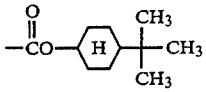 | 579 |
| 57 | $-\overset{O}{\underset{\|}{C}}-O-n\text{-}C_{16}H_{33}$ | 577 |

EXAMPLE 58

Di-n-octyl chlorophosphonate and 7 parts of triethylamine are added in succession to a suspension of 5 parts of 16,17-dihydroxyviolanthrene-5,10-dione in 150 parts of xylene. The mixture is stirred for 4 hours at 50° C. and then cooled to room temperature and filtered, and the filtrate is evaporated down. The crude product is purified by column chromatography over basic $Al_2O_3$, using ethyl acetate as the eluent. Yield: 1.7 parts of the red fluorescent dye of the formula

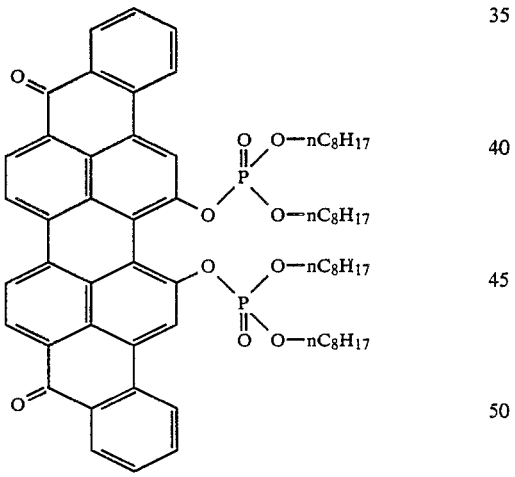

melting point: 100°-101° C.; $\lambda_{max}$: 584 nm; emission maximum: 640 nm.

EXAMPLES 59 TO 66

The red fluorescent dyes of the formulae (X) and (Xa) which are listed in the table below are prepared by a procedure similar to that described in Example 58.

| Example | | $\lambda_{max}$ [nm] |
|---|---|---|
| | Formula (Xa) T | |
| 59 | 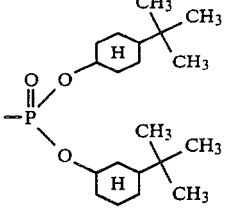 | 587 |
| 60 | 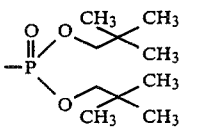 | 588 |
| 61 | 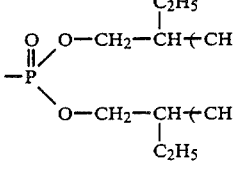 | 587 |

T
Formula (X)

| | | |
|---|---|---|
| 62 | 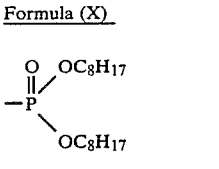 | 579 |

Formula (X)
T

| | | |
|---|---|---|
| 63 | 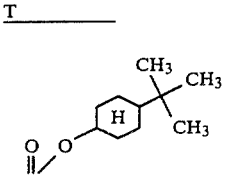 | 581 |

Formula Xa
T

| | | |
|---|---|---|
| 64 | 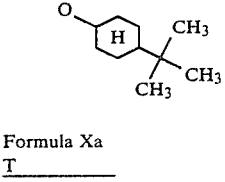 | 578 |
| 65 | 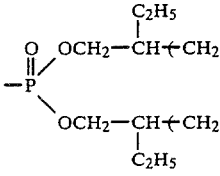 | 580 |

| Example | $\lambda_{max}$ [nm] |
|---|---|
| 66 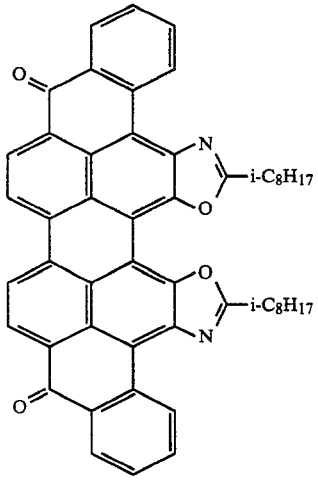 | 579 |

EXAMPLE 67

5.1 parts of isononanoyl chloride are added to 5.2 parts of 15,18-diamino-16,17-dihydroxyviolanthrene-5,10-dione in 150 parts of anhydrous trichlorobenzene and 3 parts of N,N-diethylaniline, and the mixture is heated at 130° C. for 5 hours, under nitrogen. Thereafter, 0.5 part of p-toluenesulfonic acid is added, and the mixture is heated at 212° C. for 10 hours while the vessel is flushed with nitrogen, 80 ml of trichlorobenzene distilling off, and being removed in the nitrogen stream. The mixture is worked up by diluting it with toluene, filtering off unreacted starting compound and subjecting the filtrate to column chromatography with toluene/chloroform. 1.2 parts of the fluorescent dye of the formula i-$C_8H_{17}$ = 2,4,4-trimethylpentyl are obtained. Melting point: 278° C.

If, instead of isononoyl chloride, a carboxylic acid chloride having $C_7$–$C_{20}$ carbon atoms is used, the corresponding oxazole compound with $C_6$–$C_{20}$-alkyl substituents in the 2-positions of the oxazole ring is obtained.

USE EXAMPLE 26

0.01% of the dye from Example 39 is dissolved in molten polymethylmethacrylate and distributed homogeneously therein, and the solution is processed to give fluorescent plates.

USE EXAMPLE 27

1,000 parts of polymethylmethacrylate (granules) are dusted uniformly with 0.05 part of the dye from Example 41, and the mixture is then extruded to give plates.

USE EXAMPLES 28 TO 63

Fluorescent plates or fluorescent films are produced as described in Use Examples 26 and 27:

| Use Example | Dye from Example | Material |
|---|---|---|
| 28 | 42 | polymethylmethacrylate |
| 29 | 43 | " |
| 30 | 44 | " |
| 31 | 45 | " |
| 32 | 46 | " |
| 33 | 47 | " |
| 34 | 48 | " |
| 35 | 49 | " |
| 36 | 49 | polyvinyl chloride |
| 37 | 43 | polystyrene |
| 38 | 45 | polycarbonate |
| 39 | 50 | polymethylmethacrylate |
| 40 | 51 | " |
| 41 | 52 | " |
| 42 | 53 | " |
| 43 | 54 | " |
| 44 | 55 | " |
| 45 | 56 | " |
| 46 | 57 | " |
| 47 | 58 | " |
| 48 | 59 | " |
| 49 | 60 | " |
| 50 | 61 | " |
| 51 | 62 | " |
| 52 | 63 | " |
| 53 | 64 | " |
| 54 | 65 | " |
| 55 | 66 | " |
| 56 | 67 | " |
| 57 | 46 | polystyrene |
| 58 | 50 | " |
| 59 | 53 | " |
| 60 | 56 | " |
| 61 | 59 | " |
| 62 | 62 | " |
| 63 | 67 | " |

We claim:
1. A compound of the formula

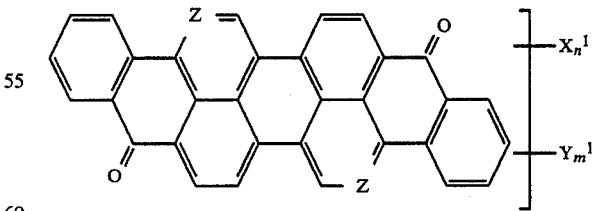

where Z is =N— or =CH—, $Y^1$ is —$OSO_2R^1$,

—$OP(OR^2)_2$, —$\overset{O}{\underset{\|}{O}}\text{C}$—$R^1$, —$\overset{O}{\underset{\|}{O}}\text{C}$—$OR^{11}$ or $OR^3$, $X^1$ is fluorine, chlorine, $C_1$–$C_{20}$-alkyl, $C_3$–$C_{20}$-alkenyl, aralkyl, —$COR^1$, —$SO_2R^1$, $$-\overset{O}{\overset{\|}{P}}(OR^2)_2,$$

—NH—COR$^1$ or —NH—SO$_2$R$^1$, m is 2, 3 or 4, n is 0, 1 or 2, R$^1$ is unsubstituted or fluorine-substituted C$_1$–C$_{20}$-alkyl, C$_{3-20}$-alkenyl, or unsubstituted C$_1$–C$_{18}$-alkyl-substituted phenyl, R$^2$ is C$_1$–C$_{18}$-alkyl, or is cyclohexyl which is substituted by 1 or 2 C$_3$–C$_{10}$-alkyl radicals or is a saturated monocyclic, bicyclic or polycyclic C$_7$–C$_{30}$-hydrocarbon radical, R$^3$ is C$_4$–C$_{20}$-alkenyl or C$_2$- or C$_3$-alkylenecarbo-C$_1$–C$_{20}$-alkoxy, or is C$_3$–C$_{20}$-alkyl-substituted benzyl, or is cyclohexyl which is substituted by 1 or 2 C$_3$–C$_{10}$-alkyl radicals, or is V or a radical of the formula

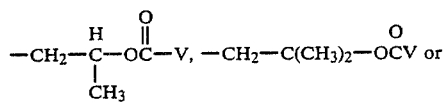

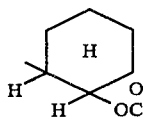

R$^{11}$ is C$_4$–C$_{20}$-alkyl or is cyclohexyl which is substituted by 1 or 2 C$_3$–C$_{10}$-alkyl radicals or is a saturated monocyclic, bicyclic or polycyclic C$_7$–C$_{30}$-hydrocarbon radical, and V is C$_8$–C$_{19}$-alkyl, 4-(C$_3$–C$_{20}$-alkyl)-phenyl or a saturated monocyclic, bicyclic or polycyclic C$_7$–C$_{30}$-hydrocarbon radical.

2. A compound as claimed in claim 1, wherein Z is =CH—, n is 0, m is 2, Y$^1$ is a radical of the formula —OSO$_2$R$^1$,

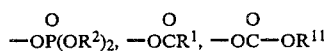

or —OR$^3$, R$^3$ is C$_4$–C$_{20}$-alkenyl or cyclohexyl which is substituted by 1 or 2 C$_3$–C$_{10}$ alkyl radicals or is V or a radical of the formula

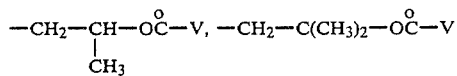

or

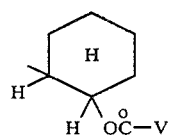

R$^1$, R$^2$, R$^{11}$ and V have the meanings given in claim 1, and the substitutents Y$^1$ are in positions 6 and 15.

3. A compound of the formula

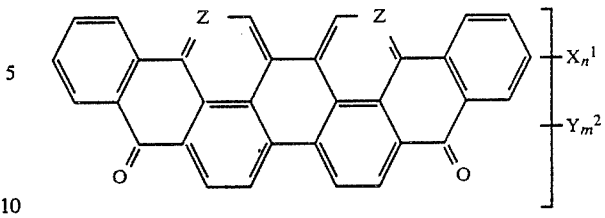

where Z is =N— or =CH—, one or more radicals Y$^2$ are each a radical of the formula —OSO$_2$R$^1$, $$-O-\overset{O}{\overset{\|}{P}}(OR^2)_2,$$

—O—CO—(C$_3$–C$_{18}$)-alkyl, —OCO—OR$^{11}$ or —OR$^4$ and the remaining radicals Y$^2$ are each —OR$^5$, X$^1$ is fluorine, chlorine, C$_1$–C$_{20}$-alkyl, C$_3$–C$_{20}$-alkenyl, aralkyl, —COR$^1$, —SO$_2$R$^1$, —OPO(OR$^2$)$_2$, —NH—COR$^1$ or —NH—SO$_2$—R$^1$, n is 0, 1 or 2, m is 2, 3 or 4, R$^1$ is unsubstituted or fluorine-substituted C$_1$–C$_{20}$-alkyl, C$_3$–C$_{20}$-alkenyl, or unsubstituted or C$_1$–C$_{18}$-alkyl-substituted phenyl, R$^2$ has the meanings given in claim 1, R$^4$ is C$_2$- or C$_3$-alkylenecarbo-C$_1$–C$_{20}$-alkoxy or is C$_3$–C$_{20}$-alkyl-substituted benzyl or is cyclohexyl which is substituted by 1 or 2 C$_2$–C$_{10}$-alkyl radicals or is V or a radical of the formula

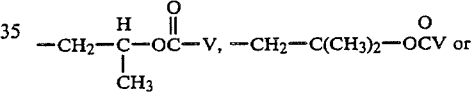

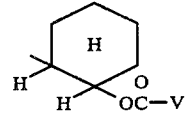

R$^{11}$ is C$_4$–C$_{20}$-alkyl or is cyclohexyl which is substituted by 1 or 2 C$_3$–C$_{10}$-alkyl radicals or is a saturated monocyclic, bicyclic or polycyclic C$_7$–C$_{30}$-hydrocarbon radical, V is C$_8$–C$_{19}$-alkyl, 4-(C$_3$–C$_{20}$-alkyl)-phenyl or a saturated monocyclic, bicyclic or polycyclic C$_7$–C$_{30}$-hydrocarbon radical and R$^5$ is C$_4$–C$_{20}$-alkyl.

4. A compound as claimed in claim 3, wherein Z is =CH—, n is 0, m is 2, Y$^2$ is a radical of the formula —OSO$_2$R$^1$,

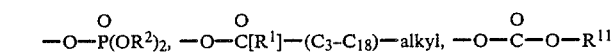

or OR$^4$, R$^4$ is cyclohexyl which is substituted by 1 or 2 C$_3$–C$_{10}$-alkyl radicals or is V or a radical of the formula

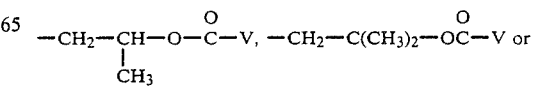

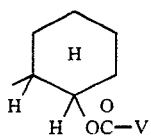

$R^1$, $R^2$, $R^{11}$ and V have the meanings given in claim 3, and the substituents $Y^2$ are in positions 16 and 17.

5. A compound as claimed in claim 1, wherein Z is =CH—, n is 0 (zero), m is 2, $Y^1$ is a radical of the formula —$OR^6$,

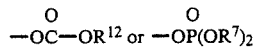

in positions 6 and 15, $R^6$ is 4-($C_3$-$C_{10}$-alkyl)-cyclohexyl, a saturated monocyclic, bicyclic or polycyclic $C_7$-$C_{30}$-hydrocarbon radical or a radical of the formula

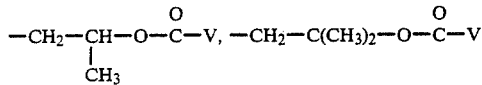

or

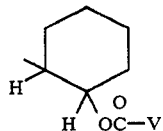

V is $C_8$-$C_{19}$-alkyl, 4-($C_3$-$C_{20}$-alkyl)-phenyl or a saturated monocyclic, bicyclic or polycyclic $C_7$-$C_{30}$-hydrocarbon radical, $R^7$ is $C_8$-$C_{18}$-alkyl, 4-($C_3$-$C_{20}$-alkyl)-phenyl or a saturated monocyclic, bicyclic, or polycyclic $C_7$-$C_{30}$-hydrocarbon radical, and $R^{12}$ is $C_8$-$C_{20}$-alkyl, 4-($C_3$-$C_{10}$-alkyl)-cyclohexyl or a saturated monocylic, bicyclic, or polycyclic $C_7$-$C_{30}$-hydrocarbon radical.

6. A compound as claimed in claim 3, wherein Z is =CH—, n is 0 (zero), m is 2, $Y^2$ is a radical of the formula

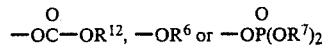

in positions 16 and 17, $R^6$ is 4-($C_3$-$C_{10}$-alkyl)-cyclohexyl, a saturated monocyclic, bicyclic or polycyclic $C_7$-$C_{30}$-hydrocarbon radical or a radical of the formula

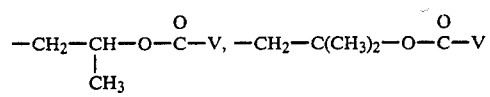

or

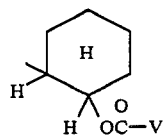

V is $C_8$-$C_{19}$-alkyl, 4-($C_3$-$C_{20}$-alkyl)-phenyl or a saturated monocyclic, bicyclic, or polycyclic $C_7$-$C_{30}$-hydrocarbon radical, $R^7$ is $C_8$-$C_{18}$-alkyl, 4-($C_3$-$C_{20}$-alkyl)-phenyl or a saturated monocyclic, bicyclic or polycyclic $C_7$-$C_{30}$-hydrocarbon radical, and $R^{12}$ is $C_8$-$C_{20}$-alkyl, 4-($C_3$-$C_{10}$-alkyl)-cyclohexyl or a saturated monocyclic, bicyclic, or polycyclic $C_7$-$C_{30}$-hydrocarbon radical.

* * * * *